United States Patent [19]

Kubota et al.

[11] Patent Number: 5,502,615
[45] Date of Patent: Mar. 26, 1996

[54] METER MODULE ASSEMBLY

[75] Inventors: Minoru Kubota; Keizo Nishitani; Yoshiaki Nakayama, all of Susono, Japan

[73] Assignee: Yazaki Corporation, Tokyo, Japan

[21] Appl. No.: 438,915

[22] Filed: May 10, 1995

[30] Foreign Application Priority Data

May 19, 1994 [JP] Japan .................... 6-105247

[51] Int. Cl.$^6$ .................... H02B 1/10
[52] U.S. Cl. .................... 361/647; 307/10.1; 361/732; 361/735; 361/752; 361/775; 361/785; 439/34
[58] Field of Search .................... 307/9.1, 10.1, 307/112, 113; 439/34, 620, 621; 361/600, 601, 622, 624, 626, 628–631, 641–648, 659, 663, 668, 706, 720, 735, 736, 749, 752, 784–785, 826, 77

[56] References Cited

U.S. PATENT DOCUMENTS

| | | | |
|---|---|---|---|
| 4,972,295 | 11/1990 | Suguro et al. | 361/706 |
| 5,038,050 | 8/1991 | Minoura | 307/10.1 |
| 5,353,190 | 10/1994 | Nakayama et al. | 361/785 |

FOREIGN PATENT DOCUMENTS

| | | |
|---|---|---|
| 57-38457 | 8/1982 | Japan . |
| 4-266537 | 9/1992 | Japan . |
| 5-333752 | 12/1993 | Japan . |

Primary Examiner—Gregory D. Thompson
Attorney, Agent, or Firm—Armstrong, Westerman, Hattori, McLeland & Naughton

[57] ABSTRACT

A meter module assembly includes a combination meter panel implemented with meters/indicating lamps and a drive circuit thereof, an electric junction box integrating functional circuits to distribute and control power sources and input/output signals for vehicle-mounted electric equipment including the meters/indicating lamps, and a switch unit integrating switches for vehicle-mounted electric equipment. The combination meter panel, the electric junction box, and the switch unit are integrally united. The electric junction box is integrally combined with the switch unit at the rear surface of the unit being arranged side by side with the combination meter panel. The electric junction box is electrically connected with the combination meter panel by a flexible circuit board.

8 Claims, 11 Drawing Sheets

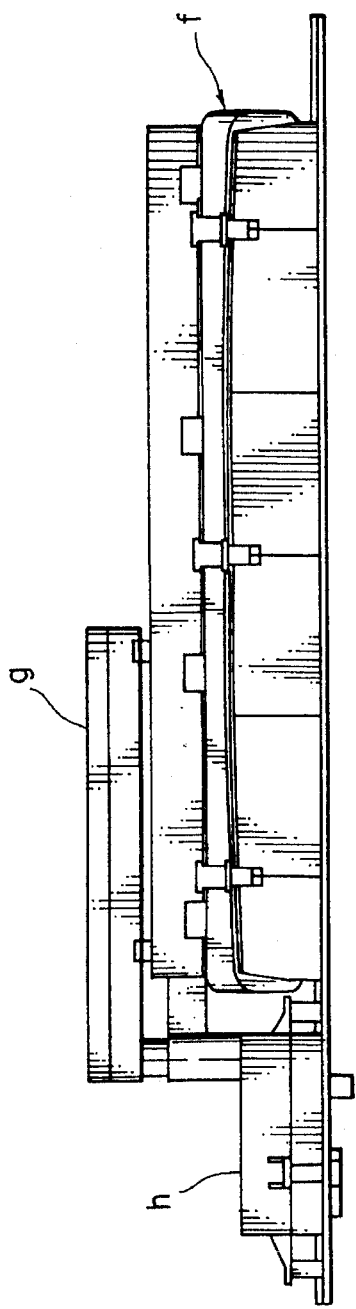
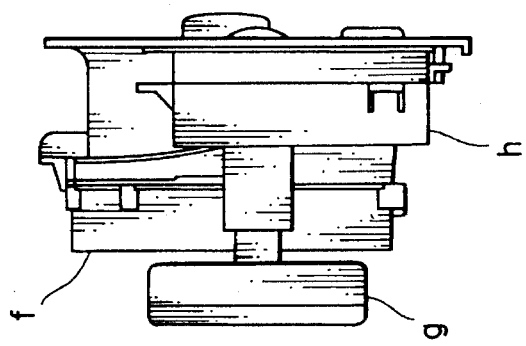
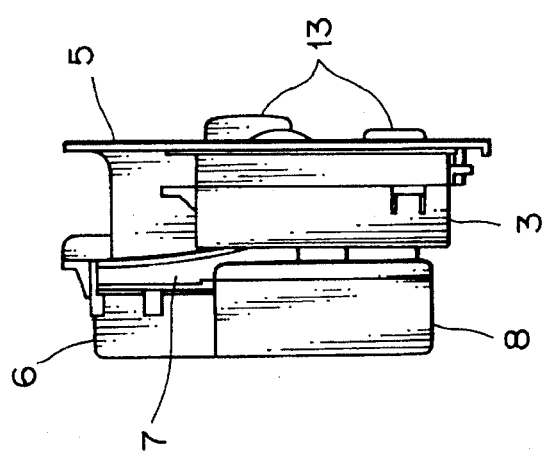

METER MODULE ASSEMBLY

BACKGROUND OF THE INVENTION

1. Field of the Invention

This invention relates to a meter module assembly that facilitates electric wiring and mounting of electric instruments in the instrument panel and its periphery of an automobile.

2. Description of the Prior Art

A great number of electric equipment are disposed in and around the instrument panel mounted in a vehicle body. Therefore, the control units monitoring and controlling the electric equipment, meters, indicator lamps, switches, and the like are also concentrated therein. Consequently, the number of wires that constitute instrument panel wiring harnesses becomes enormous, making the harnesses enlarged and heavy and causing the wiring of the harnesses complicated, resulting in much labor and time required in installation. The maintenance is also made difficult.

For the purpose of easing such an undesirable situation, it is proposed in Japanese Patent Specification Publication No. Sho 57-38457 that, to simplify the wiring of wiring harnesses and to prevent their enlargement, a plurality of electric junction boxes, in which concentrate branch connections of wiring harnesses and carry a number of circuit-protecting fuses and control relays, are dispersively arranged at suitable places in a vehicle.

Further, in Japanese Patent Application Laying-open No. Hei 4-266537, a circuit structure is proposed which comprises, as shown in FIG. 12, switches/instruments (not shown) implemented in a cluster b of an instrument panel a; a flexible printed circuit board c glued to the rear surface of the cluster b for forming electric circuits for the switches/instruments; and circuit boards e with dispersively arranged electric function parts d for storage, operation and the like needed for the electronic control of the switches/instruments, the circuit boards e being connected to the terminals of the printed circuit board e.

It is to be noted, however, that when the internal circuits of the meter panel take the place of a part of the branch circuits of the wiring harness or of the electric junction box, insofar as the control units for the electric equipment are dispersively arranged, there is a limit to simplifying the wiring harnesses, which making it difficult to cope with accelerative electronization foreseen in view of pursuit of safety and comfortableness in vehicles.

Further, although the dispersively arrangement of the electric circuits(flexible printed circuit board) for the switches/instruments and the electronic control substrates directly on the cluster rear surface is advantageous in concentrating their control circuit units on the rear surface, it involves the following disadvantages that it is technically difficult to adapt them to the irregularities on the rear surface. Further, for each type and grade of vehicles and each partial change in the specification, the design and production process must be changed, resulting in an increase in cost in case of multi-kind and small-quantity production.

Accordingly, the same applicant as the one of the present invention has made the application of Japanese Patent Application No. Hei 5-333752 in respect of an invention which facilitates electric wiring and installation of electric instruments in the instrument panel.

In the specification of the Application No. Hei 5-333752, as shown in FIG. 13, there is provided a meter module assembly J which comprises: a combination meter panel f implemented with meters/indicating lamps and a drive circuit therefore; an electric junction box g integrating functional circuits to distribute and control power sources and input/output signals for the vehicle-mounted electric equipment including the meters/indicating lamps; a switch unit h integrating switches for vehicle-mounted electric equipment; and wherein the combination meter panel, the electric junction box, and the switch unit are mounted and integrally united in the meter module assembly.

However, regarding to the arrangement in the meter module assembly J, as shown in FIGS. 14 and 15, the electric junction box g must project from the rear surface of a combination meter panel f, thereby occupying a large space in the instrument panel. As a result, there have been a drawback that the mounting of other equipment parts and the wiring of highly integrated electrical wires are difficult.

SUMMARY OF THE INVENTION

The present invention has been achieved to eliminate the above-mentioned drawback, it is therefore an object of the invention to provide a meter module assembly wherein a thinly-made meter module can be formed, thereby a space surrounding the instrument panel being made efficient use of, the aspect of the wiring being considerably simplified, and an easy fitting work of the equipment being enabled.

In order to attain the object, according to an aspect of this invention, there is provided a meter module assembly which comprises: a combination meter panel implemented with meters/indicating lamps and a drive circuit thereof; an electric junction box integrating functional circuits to distribute and control power sources and input/output signals for the vehicle-mounted electric equipment including the meters/indicating lamps; a switch unit integrating switches for vehicle-mounted electric equipment; and wherein the combination meter panel, the electric junction box, and the switch unit are integrally united, the electric junction box integrally combined with the switch unit at the rear surface of the unit being arranged side by side with the combination meter panel, and the electric junction box being electrically connected with the combination meter panel by a flexible circuit board.

Further, it is preferable that an instrument cluster finished panel is mounted in front of the combination meter panel and the switch unit to cover them.

Referring to the operation of the above-mentioned invention, as the meter module assembly adopts the electric junction box integrating functional circuits to distribute and control power sources and input/output signals for the vehicle-mounted electric equipment being integrally combined with the switch unit at the rear surface of the unit and being arranged side by side with the combination meter panel, the thinly-made meter module assembly having a decreased horizontal depth can be assembled, and which occupy only a small space in the instrument panel. As a result, it brings an advantage that the space in the instrument panel can be utilized for the mounting of other equipment parts and the wiring of wire harnesses. Further, the installation and removal works in the instrument panel can be carried out easily so that the simplified works for mounting, maintenance, and overhaul may be enabled.

Moreover, as the electric junction box has an opening facing to the same side as the front face of the combination meter panel, the functional circuits in the electric junction box can be adjusted and maintained in the same way as the meters in the combination meter panel, where the electric junction box have been kept installed in the instrument panel and only the switch unit is removed. Hence, the work efficiency is improved.

BRIEF DESCRIPTION OF THE DRAWINGS

FIG. 4 is another side view of the meter module assembly shown in FIG. 2;

FIG. 14 is a side view of the meter module in FIG. 13; and

FIG. 15 is another side view of the meter module in FIG. 13.

DETAILED DESCRIPTION OF THE PREFERRED EMBODIMENTS

Figure 1:
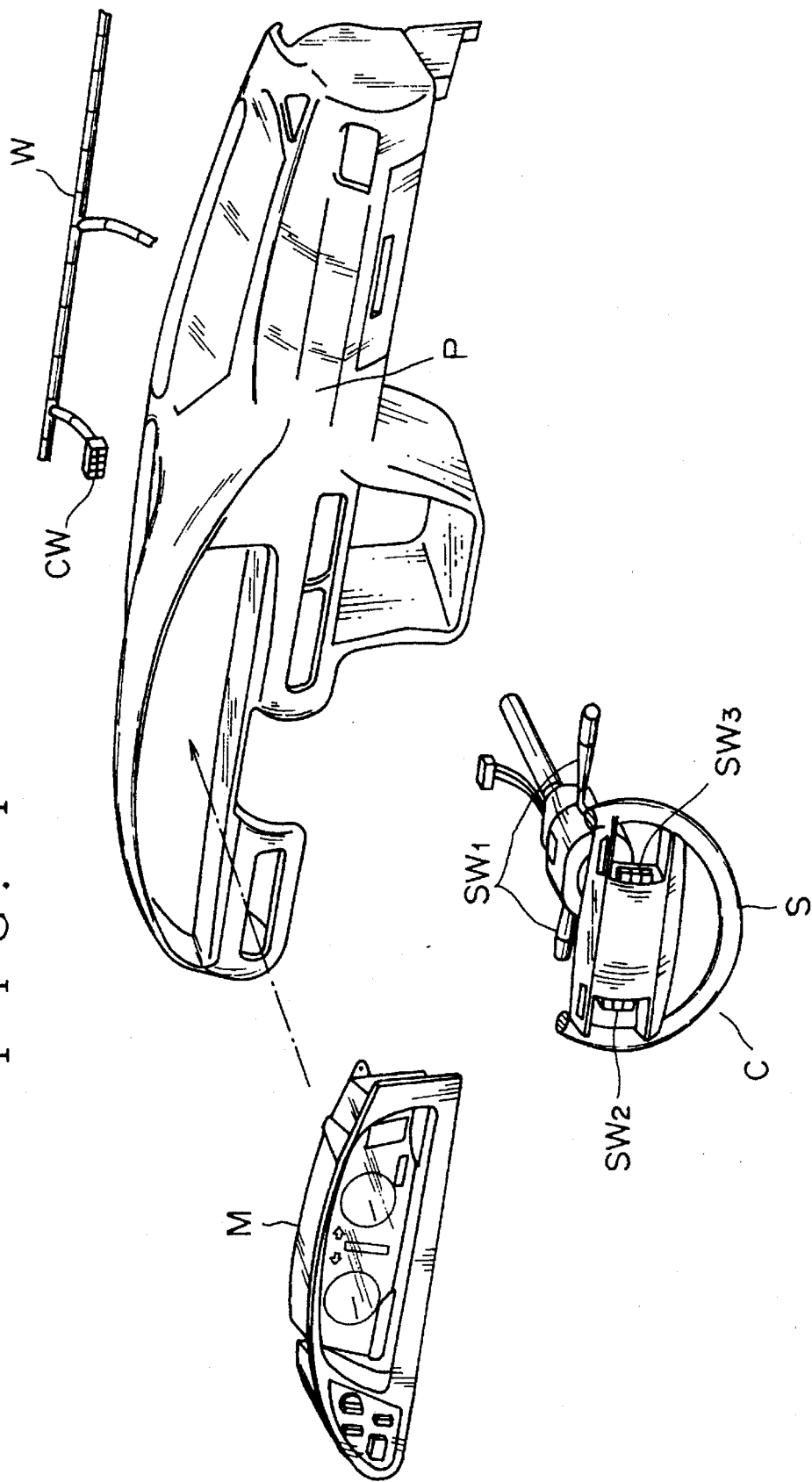
FIG. 1 is a perspective view showing a meter module assembly separated from an instrument panel according to an embodiment of this invention.
Figure 2:
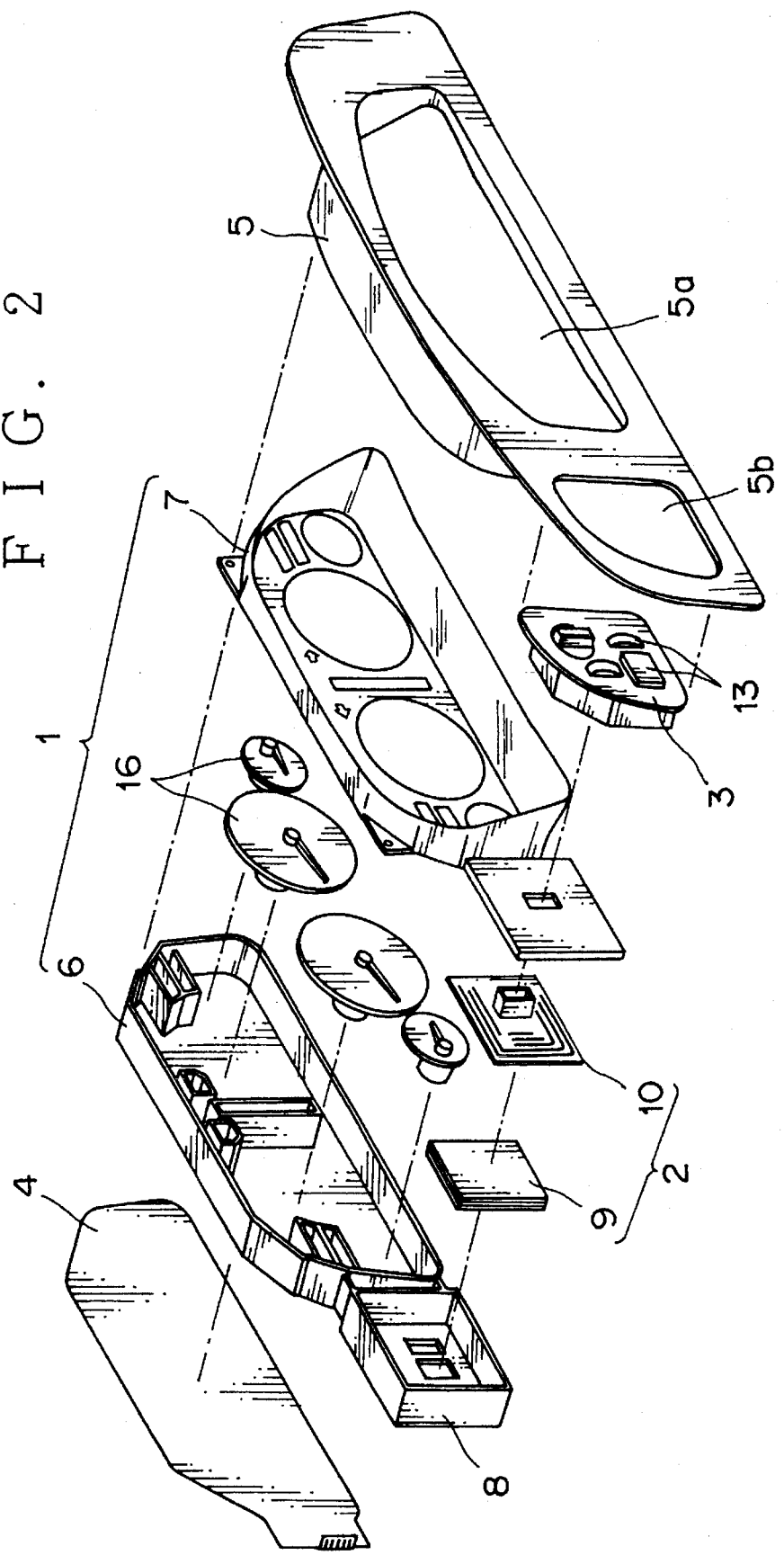
FIG. 2 is an exploded perspective view of the meter module assembly shown in FIG. 1.
Figure 3:
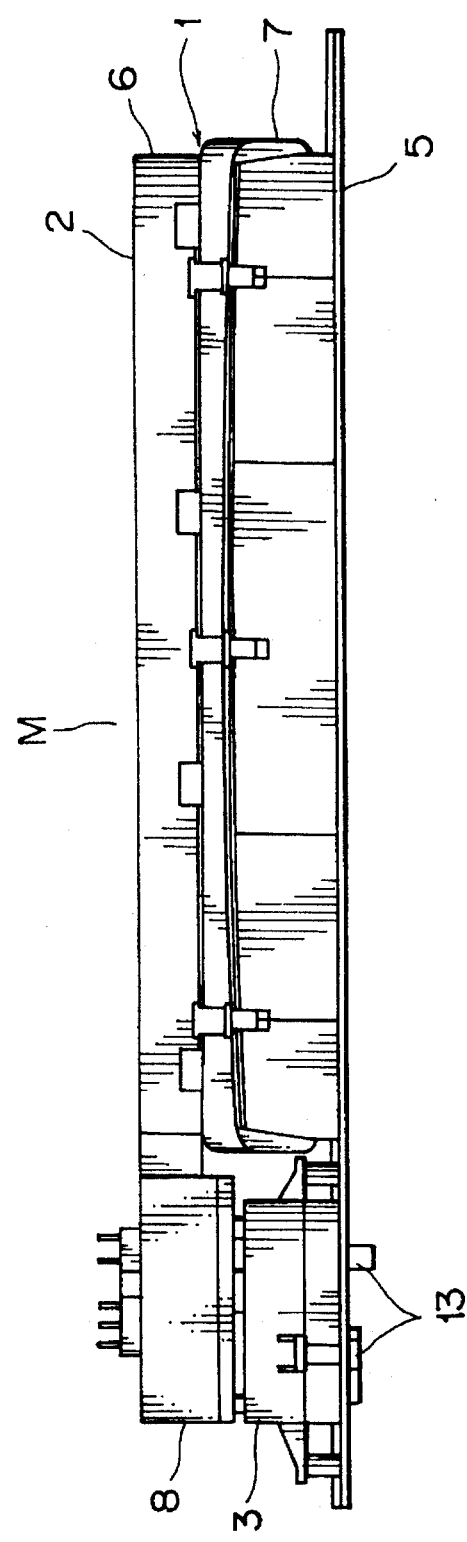
FIG. 3 is a side view of the meter module assembly shown in FIG. 2.
Figure 5:
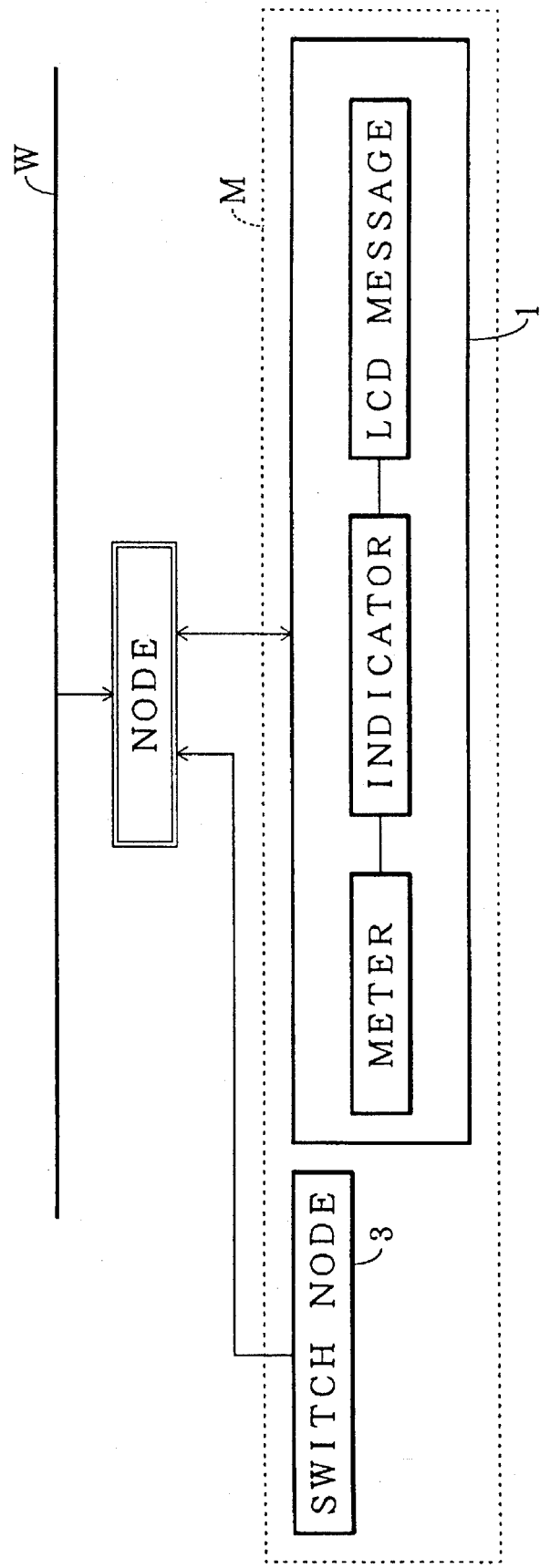
FIG. 5 is a system block diagram of the meter module assembly shown in FIG. 2.

FIG. 1 is a perspective view showing a meter module assembly M according to an embodiment of this invention, the meter module assembly being separated from an instrument panel P. FIG. 2 is an exploded perspective view showing the meter module assembly M, FIG. 3 is a side view and FIG. 4 is another side view thereof. FIG. 5 is a system block diagram of the meter module assembly M. Referring to these figures, the meter module assembly M and a steering wheel S with a column switch assembly C are mounted in the instrument panel P from the front side thereof, while an instrument panel harness W is also mounted in the panel from the rear side thereof. The column switch assembly C includes, e.g. switches such as a horn switch SW2 and tilt/tele switch SW3 in addition to multi-function switches SW1 installed on the left and right sides.

The meter module assembly M (in FIG. 2, meters 16 and the like are illustrated with separated from the panel) comprises a combination meter panel 1 implemented with meters/indicating lamps and drive circuits thereof; an electric junction box 2 integrating functional circuits to distribute power sources and input/output signals for vehicle-mounted electric equipment including the meters/indicating lamps; a switch unit 3; a flexible circuit board 4; and an instrument cluster finished panel 5.

In respect of the instrument panel 1, a frame-shaped meter case 6 is implemented with meters/indicating lamps and drive circuits thereof. The drive circuits are electrically connected to the flexible circuit board 4 installed in the rear of the meter case 6 and the instrument panel 1 is furnished with a meter cover 7 so as to be assembled in a body. At one end of the meter case 6, a case 8 receiving the electric junction box is provided, the opening of the case facing the same side as the side that the meter case 6 faces.

Figure 6:
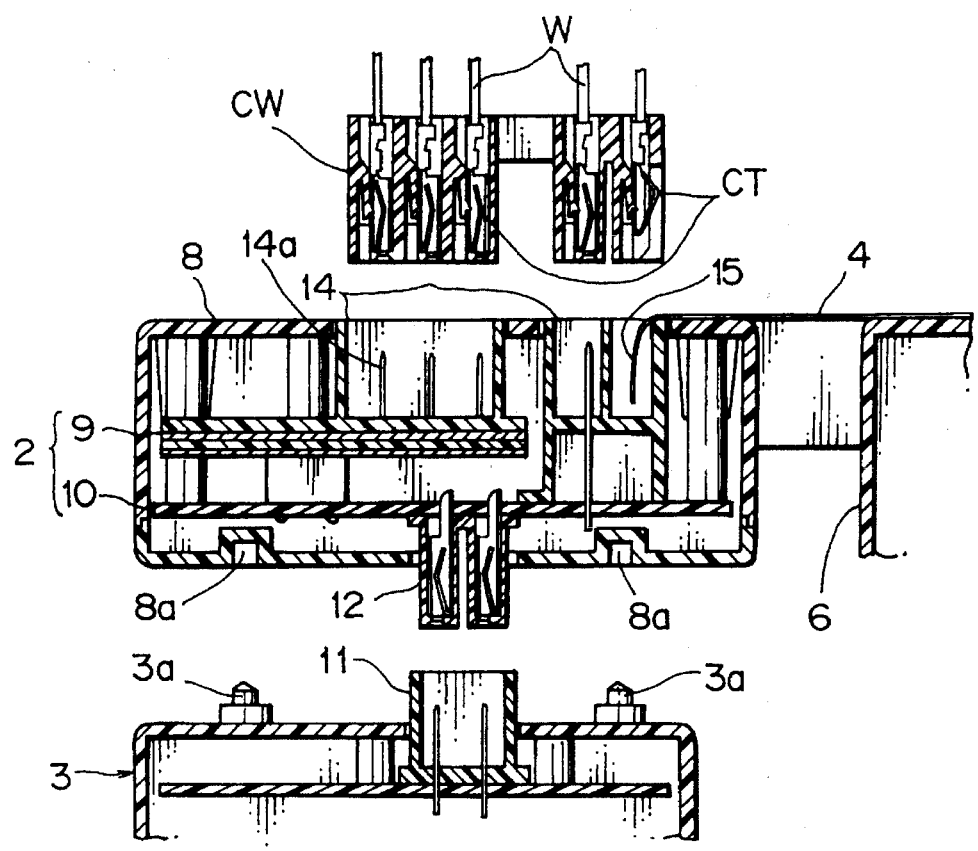
FIG. 6 is a longitudinal sectional view showing a state just prior to the state that a combination meter panel, an electric junction box, and switch units are connected to each other in respect of the meter module assembly shown in FIG. 2.
Figure 7:
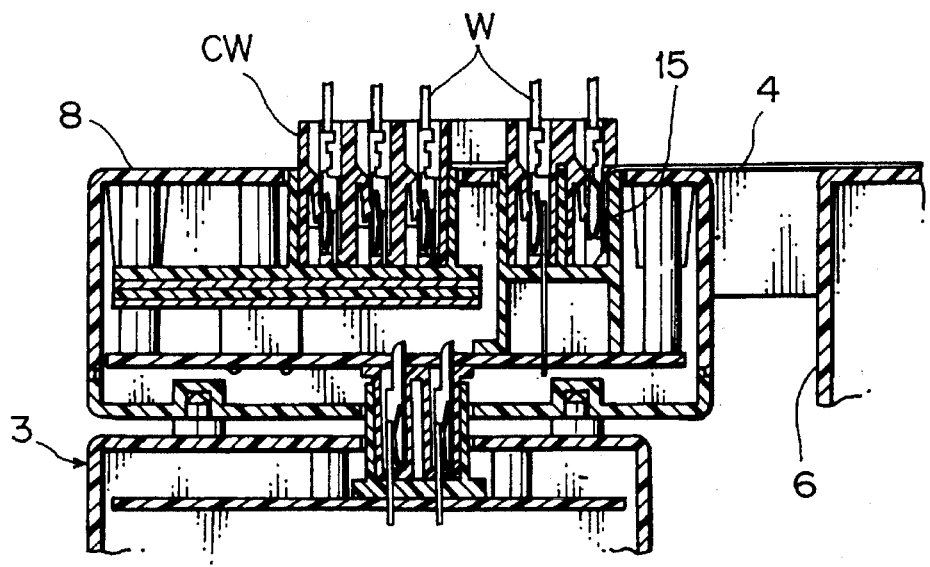
FIG. 7 is a longitudinal sectional view showing a state that a combination meter panel, an electric junction box, and switch units have been connected to each other in respect of the meter module assembly shown in FIG. 2.

The electric junction box 2 composes busbur circuit boards 9, and a centerized-control-circuit board 10 to distribute power sources and input/output signals for vehicle-mounted electric equipment including the meters/indicating lamps installed in the meter case 6. As illustrated in FIGS. 6 and 7, the electric junction box is accommodated in the case 8 receiving the junction box. A connector 11 attached to the switch unit 3 is engaged with a connector 12 attached to the electric junction box 2, and also an engagement recess 8a formed in the case 8 receiving the electric junction box is engaged with a locking projection 3a formed in the switch unit 3 so that the switch unit 3 is fixed to the case 8 receiving the junction box to be united in a body. Designated 13 is switches or the like arranged in the switch unit 3.

On the rear surface of the electric junction box 2, a connector 14 having a plurality of terminals is provided. The connector 14 is connected with a connector CW of an instrument panel harness W. Thereby, terminals 14a of the connector 14 connect with terminals CT of the connector CW, and at the same time, a terminal 15 with a contact face attached on one end of the flexible circuit board connects with a terminal CT so that, as shown in FIG. 7, the instrument panel harness W connects with the electric junction box 2 which has been electrically connected with the combination meter panel 1 and also the switch unit 3.

An instrument cluster finished panel 5 is a face panel, wherein a hole 5a for the combination meter panel and an opening 5b for the switch unit are formed in the front face thereof, covering the front face of the instrument panel to complete the meter module assembly M. An instrument cluster finished panel 5 fitted for the instrument panel P is normally furnished, but the combination meter panel may be directly furnished to the instrument panel P without an instrument cluster finished panel 5.

Figure 8:
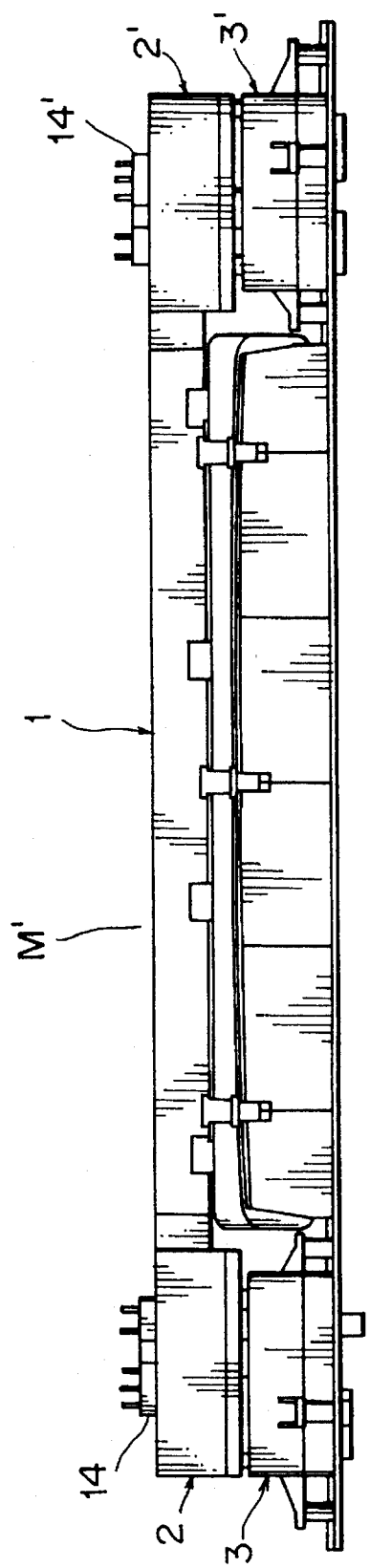
FIG. 8 is a longitudinal sectional view showing according to another embodiment of this invention.

FIG. 8 is a plan illustrating a meter module assembly M' in respect of another embodiment of the present invention.

The meter module assembly M' is an assembly having electric junction boxes 2, 2' and switch units 3,3', each of which is arranged at each side of a combination meter panel.

The meter module assembly M' has connectors 14, 14' on the rear surface thereof, each of which is connected to an instrument panel harness W.

The meter module assembly M' is suitably used when the instrument panel is designed with some relative limitations or when a large number of composing parts are received. Further, the assembly M' may facilitate to make use of a space in an instrument panel and also to make a thinly-made assembly itself.

The meter module assembly M is mounted to the instrument panel P in the way of the following process. Hereupon, the explanation is made only about the meter module assembly M because the meter module assembly M' is mounted in the substantially same way.

From the front of the instrument panel P, the meter module assembly M is inserted to be fixed in the panel. Then, the connector 15 attached on the rear face of the electric junction box 2 is mated with the connector CW of the instrument panel harness W, and such a wire harness as a cowl side wire harness 19A / an engine room main wire harness 19B, as shown in FIG. 9, may be also connected similarly.

Figure 9:
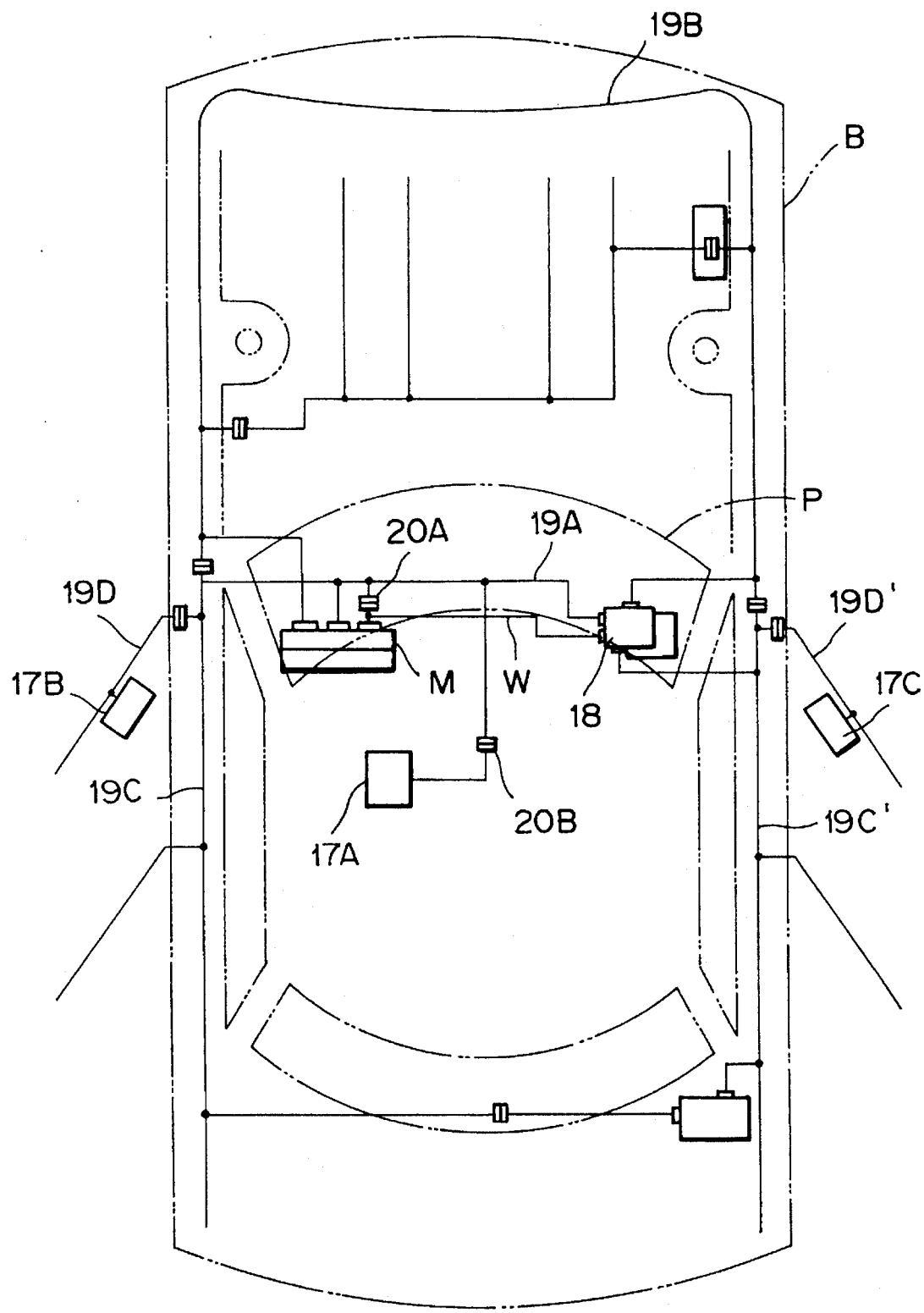
FIG. 9 is an explanatory diagram showing an example of a wire harness arrangement in a vehicle utilizing the meter module assembly shown in FIG. 2.

FIG. 9 is an explanatory diagram showing an example of a wire harness arrangement in a vehicle utilizing a meter module assembly M according to an embodiment of this invention. In the drawing, designated 17A to 17C are a circuit control unit or an electric junction box and designated 18 is a main electrical junction box in a known structure mounted by many fuses, relays and so on.

In the left side of the instrument panel P, the meter module assembly M is installed; in the right side thereof, the main electric junction box 18 is located; and in the intermediate portion thereof, there is arranged a sheet module 17A for controlling various kinds of optional electric equipment. Further, on right and left doors, a door module 17B for a driver and a door module 17C for the other front sheet are arranged.

Designated 19A is a cowl-side wire harness; 19B an engine room wire harness; 19C and 19C' floor wire harnesses; 19D and 19D' door wire harnesses; and, 20A and 20B female and male connectors respectively.

Figure 10:
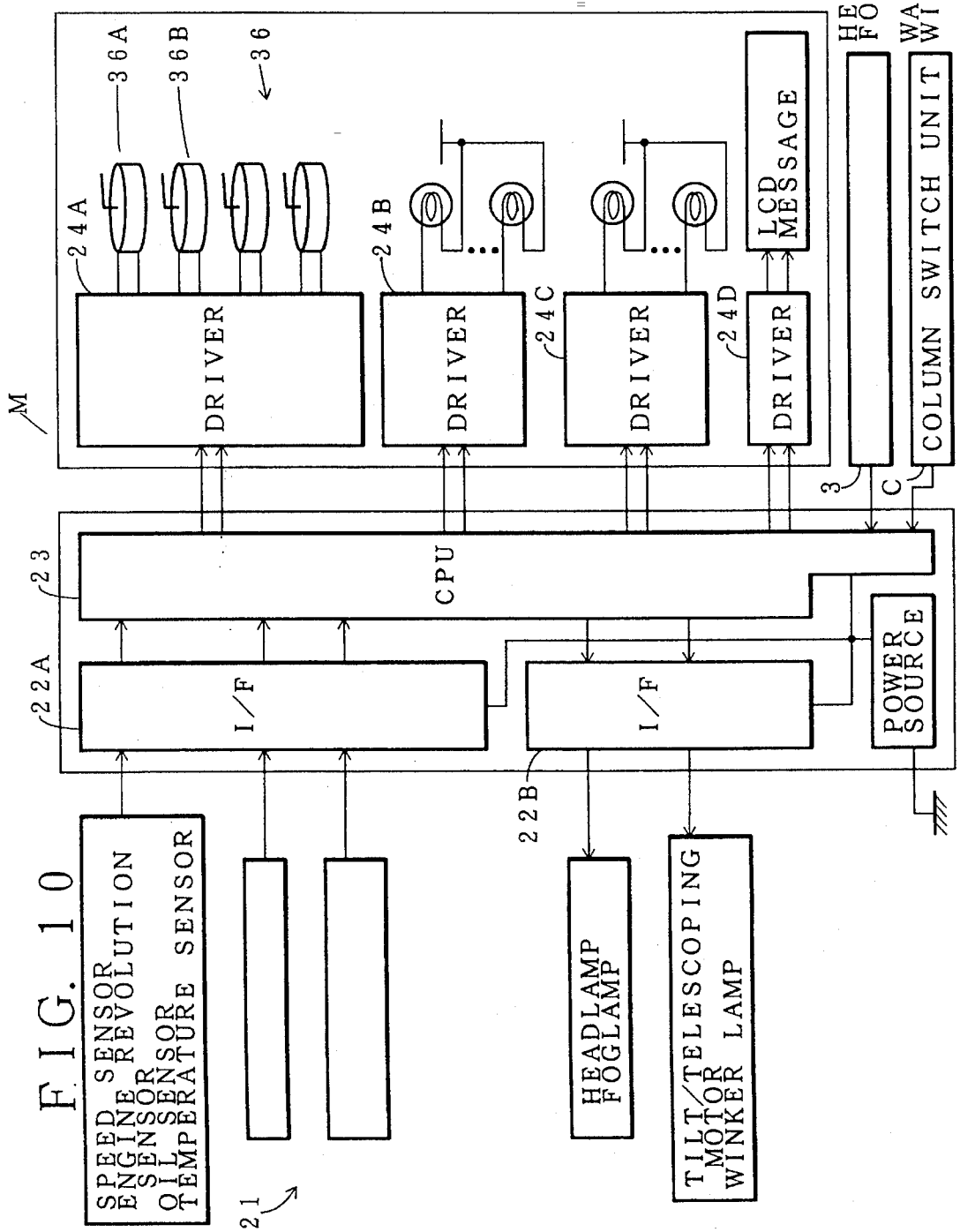
FIG. 10 is a block wiring diagram of the meter module assembly shown in FIG. 2.
Figure 11:
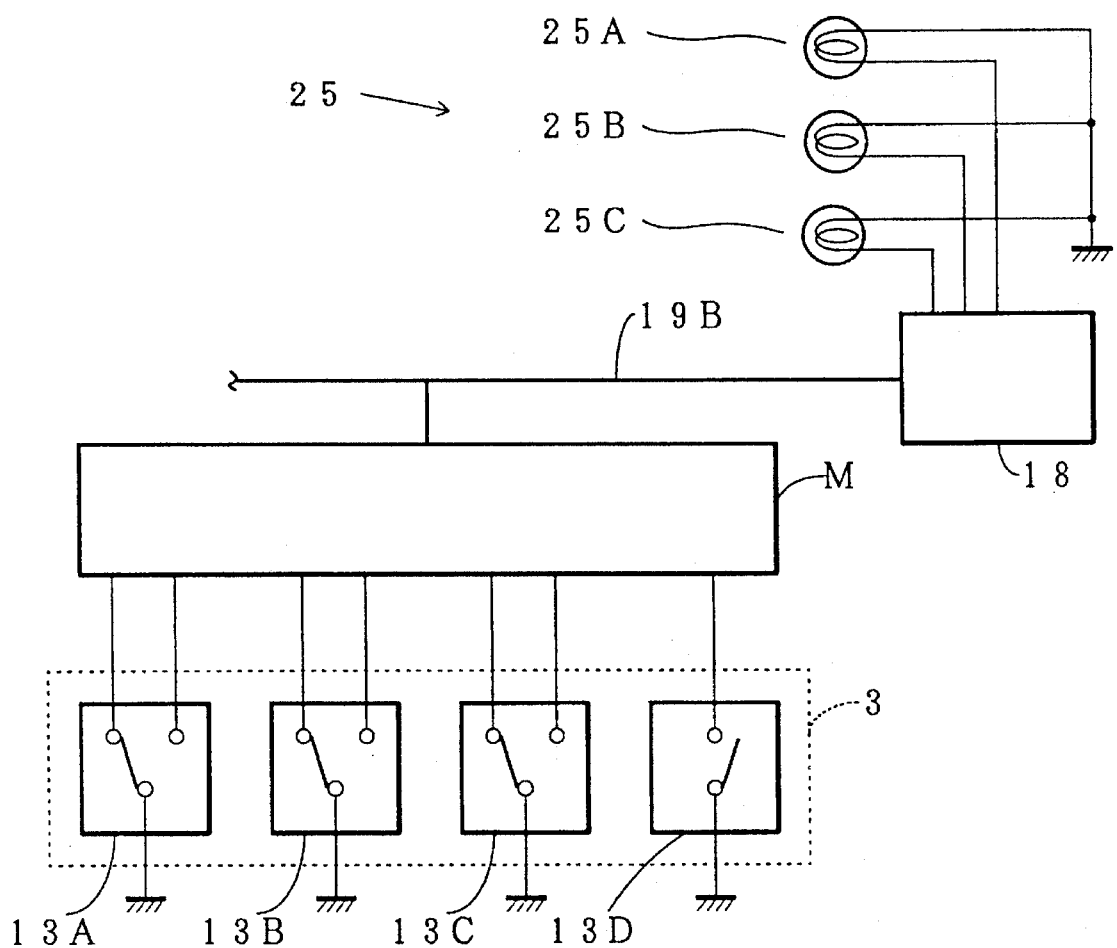
FIG. 11 is a wiring diagram of a switch circuit portion of FIG. 9.
Figure 12:
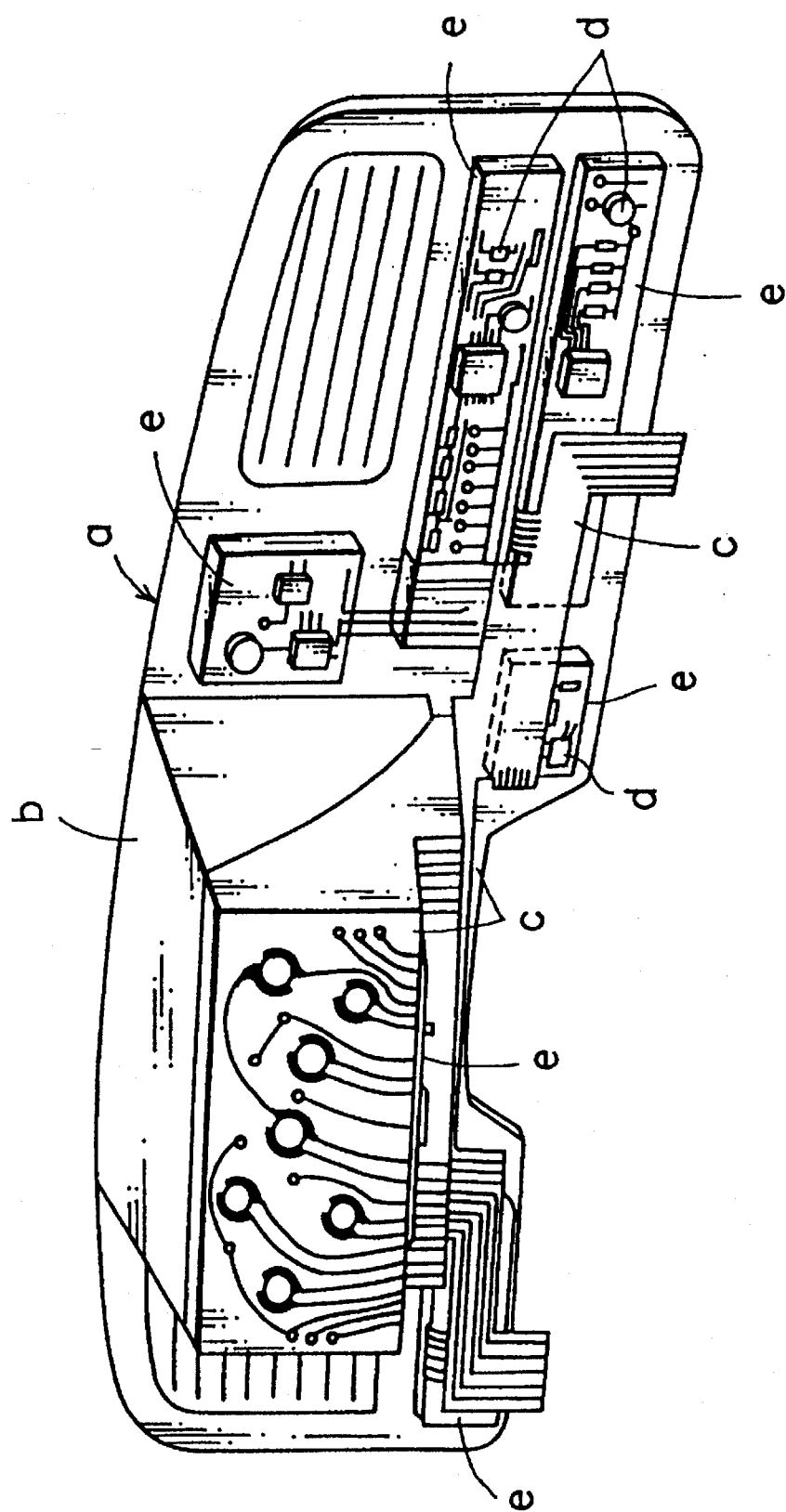
FIG. 12 is an explanatory diagram showing an aspect of electric circuits of a conventional instrument panel.
Figure 13:
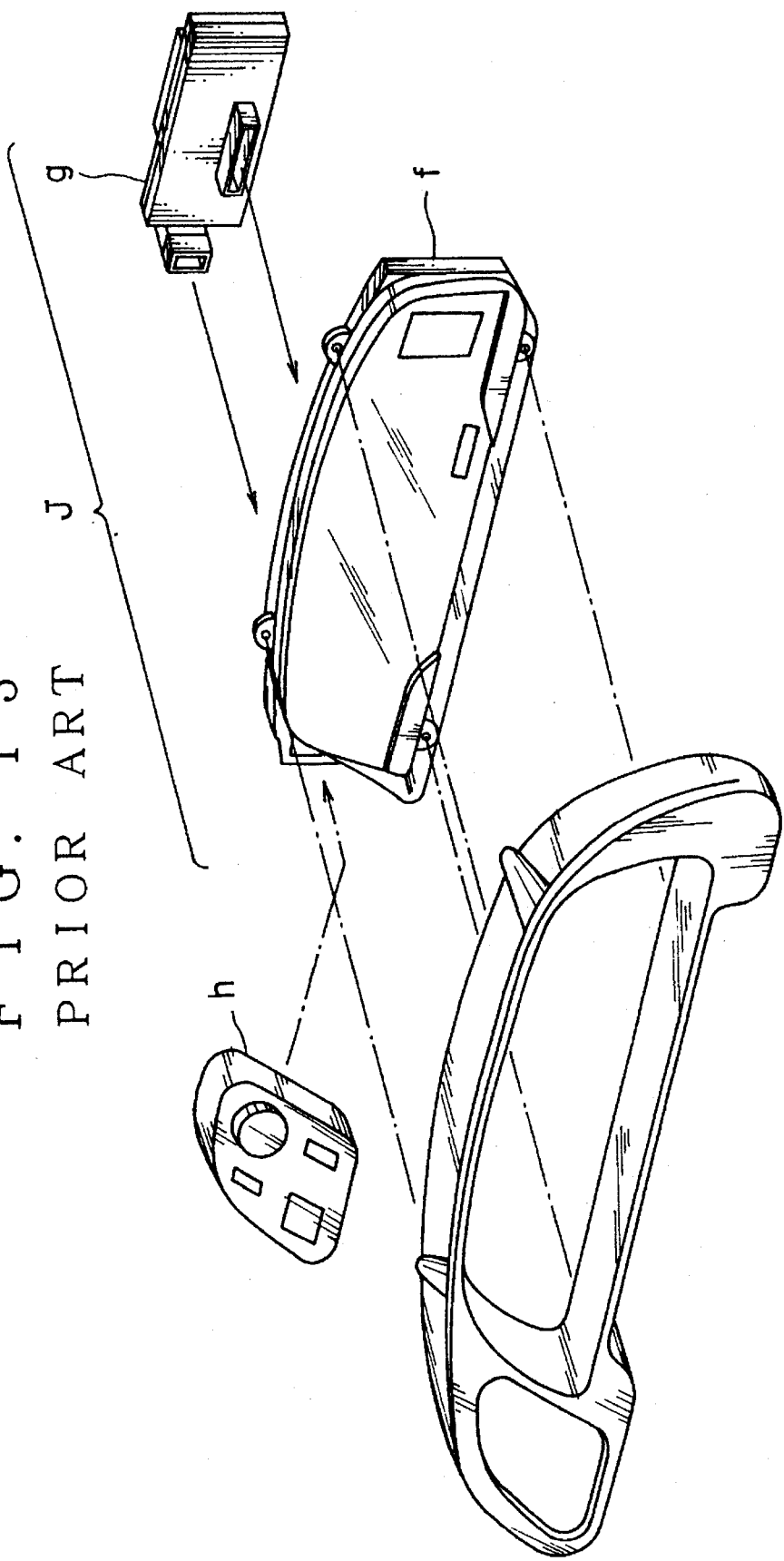
FIG. 13 is an explanatory diagram showing a disassembled conventional meter module.

FIG. 10 is a block wiring diagram of the meter module assembly M and FIG. 11 shows the wiring of its switch circuits.

In FIG. 10, designated 21 is some kinds of signal generating means; 22A an input I/F circuit; 22B an output I/F circuit; 23 CPU(central processing unit); and, 24A to 24D some kinds of driver circuits.

The electric junction box 2 units functional circuits (transducers for multiplex-transmission signals) integrally mounted therein and some kinds of switches 13A to 13D are united to compose the switch units 3, 3'. As they are directly connected to the CPU 23, no sub harnesses for their connection are needed. While, in FIG. 11, designated 25A to 25C are such lamps 25 as a head lamp / a fog lamp.

Referring to the operational effect of the above-mentioned invention, as the meter module assembly comprises the electric junction box integrating functional circuits being integrally combined with the switch unit at the rear surface of the unit and being arranged side by side with the combination meter panel, the thinly-made meter module assembly having a decreased horizontal depth can be assembled. Therefore, it occupy only a small space in the instrument panel as well as it facilitates a weight saving. As a result, it brings an advantage that the space in the instrument panel can be utilized for the mounting of other equipment parts and the wiring of wire harnesses. Further, the installation and removal works in the instrument panel can be carried out easily so that the simplified works for installation, maintenance, and overhaul may be enabled.

Moreover, as the electric junction box has an opening facing to the same side as the front face of the combination meter panel, the functional circuits in the electric junction box can be adjusted and maintained in the same way as the meters in the combination meter panel, where the electric junction box have been kept installed in the instrument panel and only the switch unit is removed. Hence, the work efficiency is improved.

What is claimed is:

1. A meter module assembly comprising:

a combination meter panel implemented with meters/indicating lamps and a drive circuit thereof;

an electric junction box integrating functional circuits to distribute and control power sources and input/output signals for vehicle-mounted electric equipment including said meters/indicating lamps;

a switch unit integrating switches for vehicle-mounted electric equipment; and wherein said combination meter panel, said electric junction box, and said switch unit are integrally united, said electric junction box integrally combined with said switch unit at the rear surface of said unit being arranged side by side with said combination meter panel, and said electric junction box being electrically connected with said combination meter panel by a flexible circuit board.

2. A meter module assembly according to claim 1, wherein an instrument cluster finished panel is mounted in front of said combination meter panel and said switch unit to cover them.

3. A meter module assembly according to claim 1, wherein said electric junction box comprises busbur circuit boards, and a centerized-control-circuit board to distribute power sources and input/output signals for vehicle-mounted electric equipment including said meters/indicating lamps.

4. A meter module assembly according to claim 3, wherein a connector attached to said switch unit is engaged with a connector attached to said electric junction box, and also an engagement recess formed in a case receiving said electric junction box is engaged with a locking projection formed in said switch unit so that said switch unit is fixed the case to be united in a body.

5. A meter module assembly according to claim 1, wherein on the rear surface of said electric junction box, a connector having a plurality of terminals is provided, said connector being one connected with a connector of an instrument panel harness.

6. A meter module assembly according to claim 5, wherein a terminal with a contact face attached on one end of said flexible circuit board is provided to connect with a terminal of the connector of said instrument panel harness.

7. A meter module assembly according to claim 1, wherein a couple of said electric junction boxes integrally combined with said switch unit, each of which is arranged apart from each other.

8. A meter module assembly according to claim 1, wherein the meter module assembly has a couple of connectors having a plurality of terminals on the rear surface thereof, each of which is connected to an instrument panel harness.

* * * * *